US007870017B2

(12) United States Patent
Kamath

(10) Patent No.: US 7,870,017 B2
(45) Date of Patent: Jan. 11, 2011

(54) METHOD AND APPARATUS FOR POSITION BIDDING

(75) Inventor: Anil Kamath, Palo Alto, CA (US)

(73) Assignee: Efficient Frontier, Sunnyvale, CA (US)

( * ) Notice: Subject to any disclaimer, the term of this patent is extended or adjusted under 35 U.S.C. 154(b) by 1554 days.

(21) Appl. No.: 10/773,653

(22) Filed: Feb. 6, 2004

(65) Prior Publication Data

US 2004/0167816 A1 Aug. 26, 2004

Related U.S. Application Data

(60) Provisional application No. 60/450,597, filed on Feb. 26, 2003.

(51) Int. Cl.
G06F 17/30 (2006.01)
(52) U.S. Cl. ........................................................ 705/10
(58) Field of Classification Search ................. 705/10
See application file for complete search history.

(56) References Cited

U.S. PATENT DOCUMENTS

| | | | |
|---|---|---|---|
| 6,199,050 B1 * | 3/2001 | Alaia et al. ................. 705/37 |
| 6,408,283 B1 | 6/2002 | Alaia et al. | |
| 6,499,018 B1 | 12/2002 | Alaia et al. | |
| 6,792,399 B1 * | 9/2004 | Phillips et al. ............ 705/36 R |
| 7,035,812 B2 * | 4/2006 | Meisel et al. ................. 705/14 |
| 7,363,300 B2 * | 4/2008 | Davis et al. .................... 707/3 |
| 7,406,436 B1 * | 7/2008 | Reisman ....................... 705/10 |
| 2003/0220866 A1 | 11/2003 | Pisaris-Henderson et al. | |
| 2004/0225562 A1 | 11/2004 | Turner | |
| 2005/0144068 A1 | 6/2005 | Calabria et al. | |
| 2005/0216516 A1 | 9/2005 | Calistri-Yeh et al. | |
| 2008/0097830 A1 * | 4/2008 | Kim ............................ 705/10 |

FOREIGN PATENT DOCUMENTS

WO WO0103041 A1 1/2001

OTHER PUBLICATIONS

Ward et al., "Internet Shopping, Consumer Search and Product Branding", Department of Agricultural and Consumer Economics, University of Illinois, Urbana-Champaign, Jul. 1999.*
Lee at al., "Analysis and Visualization of Metrics for Online Merchandising", WEBKDD '99, LNAI 1836, pp. 126-141, 2000.*

* cited by examiner

Primary Examiner—Romain Jeanty
Assistant Examiner—Thomas Mansfield
(74) Attorney, Agent, or Firm—Schwabe, Williamson & Wyatt P.C.

(57) ABSTRACT

A method and system for determining a bidding strategy for on-line query answer set or contextual advertisement positions for marketing options is described herein.

25 Claims, 2 Drawing Sheets

METHOD AND APPARATUS FOR POSITION BIDDING

RELATED APPLICATION

This application is a non-provisional application of provisional application Ser. No. 60/450,597, filed on Feb. 26, 2003, titled "METHOD AND APPARATUS FOR ON-LINE QUERY ANSWER SET POSITION BIDDING," claims priority to said provisional application, and fully incorporates its specification and drawing by reference.

FIELD OF THE INVENTION

The present invention relates generally to the fields of data processing and electronic advertising. More specifically, the present invention relates to on-line query answer set or contextual advertisement position bidding. On-line query answer set may also be referred to as on-line search result answer/return set.

BACKGROUND OF THE INVENTION

In conventional systems, marketing purchases (also referred to as advertisement buys) are typically optimized individually and performance measurement and purchase decisions are made separately for each marketing option. An organization can have a large number of available marketing options (advertisement buys) that are priced differently, and deliver different results. For example, search engines have paid listing, where the cost per click to bring a visitor from the search engine is different based on the keyword that the visitor on the search engine searched for and the position at which the advertisement is displayed. Similarly, most web sites have different charges for different contextual advertisement positions.

Thus, an approach that enables a decision maker to make marketing purchase (advertisement buy) decisions, by allocating dollars across a portfolio of marketing options (advertisement buys) so as to meet specific composite goals and performance criteria, is desirable.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Embodiments of the present invention includes a system and its components that enable a decision maker to make marketing purchase (advertisement buy) decisions, by allocating dollars across a portfolio of marketing options (advertisement buys) so as to meet specific composite goals and performance criteria.

In the description to follow, embodiments of the present invention will be described using terminologies commonly employed by those skilled in the art to present their work, including but not limited to terms like, web site, web pages, clicks, on-line query, search engine, answer set, modeling, regression analysis, optimization, objective functions, constraints, and so forth. These terms are to be accorded the common meaning as understood by those of the ordinary skill in the arts of information technology and applied mathematics.

Process Flow

In one embodiment, the process of the present invention may comprise of the following operations:

Model
Optimize
Execute

Figure 1:
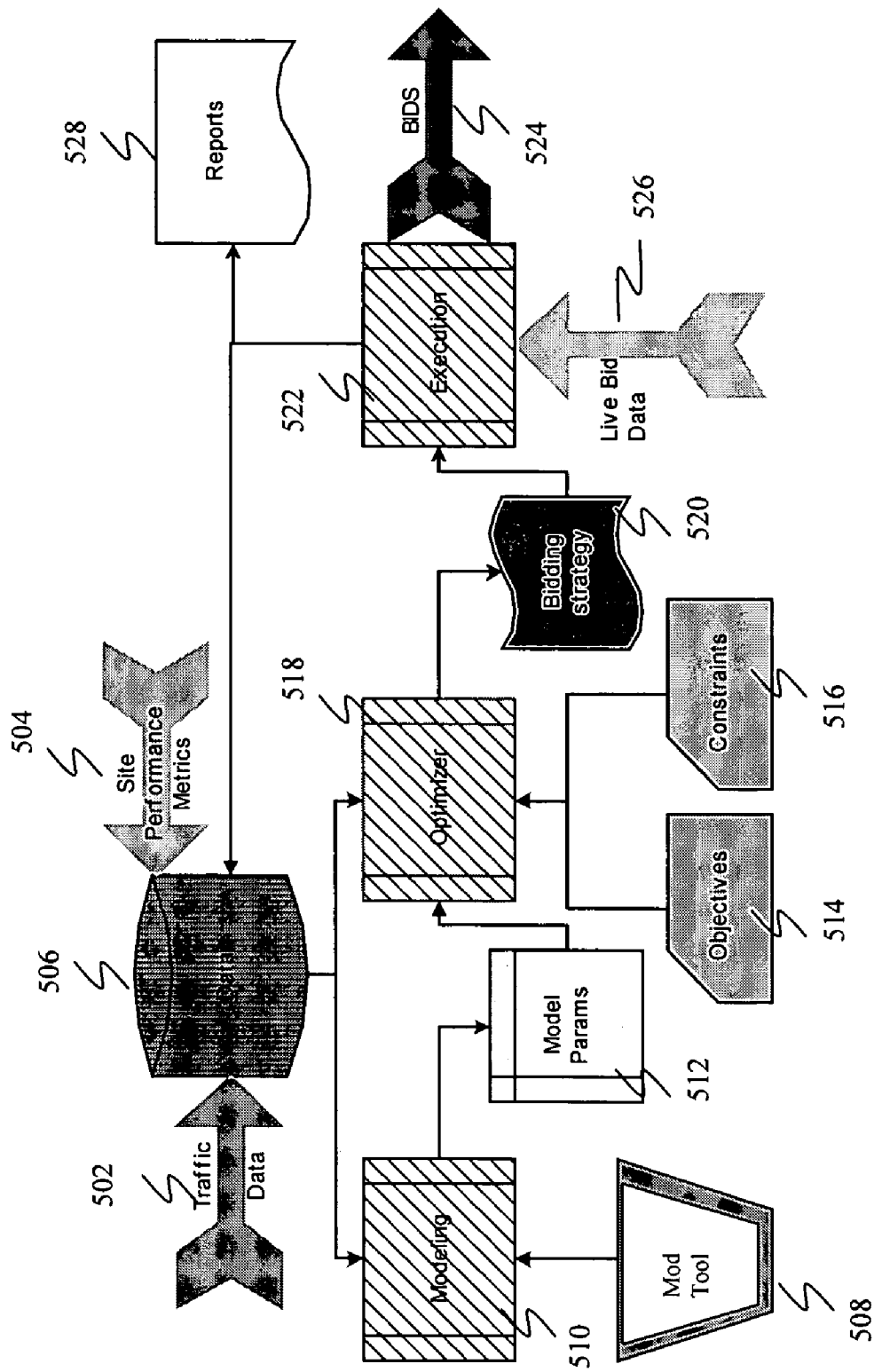
FIG. 1 is an overview illustrating the present invention according to one embodiment.

Each aspect will be described in turn, referencing FIG. 1.

Model

In one embodiment, the system may include modeling 510 for the different marketing options (advertisement buys) available to an organization. The modeling parameters 512 may include, but are not limited to the number of visitors, the cost of bringing the visitors, number of unique visitors, transactions, the revenues generated by the visitors, and so forth. The models could be statistical models based on measurable empirical data 506.

In one embodiment, the models are constructed by gathering empirical data 506 by purchasing the various marketing options for a limited period of time, and measuring the resulting clicks, visitors, transaction, revenues, and so forth 502 and 504. Further, for the embodiment, a least mean squared fit over the empirical data may be performed to determine the expected values of the model parameters 512, using a modeling software 508 like AMPL (a modeling language for linear programming) or Splus (software for statistical modeling). E.g. for the paid listings on search engines like Overture and Google, empirical data for different keywords at different positions may first be obtained, and then, the ratio of clicks at position i to clicks at position i+1 through a least mean squared regression, may be determined. Using this model, the traffic that can be generated at different positions and/or for different keywords may be inferred.

In various embodiments, the models include in particular a click model that forecast the number of clicks for the various on-line query answer set or contextual advertisement positions available from various search engines and/or web sites, and a revenue model that forecast the revenue based at least in part on click conversion.

Optimize

In one embodiment, once the models for the different variables are within the scope to improve or control, the models 510 may be specified to perform an optimization of the measurable objectives 514 that have been modeled such as number of unique visitors, number of transactions, revenues, profits, etc. that can be generated by using some combination of the marketing options. The specification may be effectuated through a variety of input techniques. In various embodiments, a graphical user interface is provided specific to the models 510, or more specifically, the model parameters and their relationships 512. The optimization of these objectives 514 may be subject to constraints 516 that involve controlling some other measurable modeled variables such as the money spent on marketing, certain minimum lead generation requirements, etc.

The optimization problem may be modeled as a mathematical programming problem e.g. if all the models involved are linear models the optimization problem is a linear programming problem, which can be solved using a standard linear programming/optimization solver like CPLEX or MINOS 518. In other embodiments, the optimization problem may be formulated as a non-linear problem, and solved employing any one of a number of non-linear optimization techniques. The solution to the optimization problem can be a set of marketing purchase decisions or a market budget allocation strategy (also refer to as a bidding strategy) 520 that needs to be executed by the organization.

Objective functions

In various embodiments, the measurable goals (or objectives) 512 that may be used may be one or more of the followings

- Maximize traffic (also referred to as clicks) for the marketing options for a given budget
- Minimize cost to get certain traffic for the marketing options
- Minimize customer or visitor acquisition cost for the products or services of the marketing options
- Maximize revenues for the products or services of the marketing options
- Maximize profits for the products or services of the marketing options
- Minimize marketing expenses for the marketing options
- Maximize increases of customer sign-ups or registrations for products or services of the marketing options In alternate embodiments, other objective functions 512 may be employed in addition to or in lieu of the earlier enumerated objective functions.

Constraints

In various embodiments, the measurable constraints on the marketing decisions may be one or more of the following enumerated constraints:

- Traffic to certain URLs (Uniform Resource Locators) should exceed certain amount during a certain period
- Certain keywords should be at specified position
- Cost per click should not exceed certain amount
- User acquisition costs should be below certain amount
- Marketing expenses for the marketing options should be below a budget limit
- Revenues generated for products or services of the marketing options should be below a limit Execute In various embodiments, the marketing strategy or spending decisions (bidding strategy) 520 may be implemented 522 to make bids 524. The implementation may also be monitored and adjusted 522 in the context of the changing marketing options available 526 and the changing objectives and requirements of the organization 514 and 516 (re-performing the earlier described optimization operation). For example, based on the availability of cheaper marketing options 526, a decision may be made to stop an advertising campaign at a specific site or for paid listings on search engines, the bid or the maximum cost per click that an organization presumably is willing to pay for a paid listing for a keyword, may be changed, based on the gross margins generated from transactions made by visitors clicking on that keyword listing. In various embodiments, the results of the implementations are captured as reports 528, and the data contained in the reports 528 are fed back to add to or update the empirical data employed to build the models 510. If necessary, the models 510 may be updated, and the optimization process 518 may be re-performed to yield a new bidding strategy 520.

Making a Market in Marketing

The present invention may also be employed to create a market in marketing options, where sites "the sellers" with marketable visitors can ask varying rates for different advertising options and the organizations that need those visitors "the buyers" bid different prices for the different options depending on the value they associate with the visitor. An entity can then play the role of the market maker in such a market by matching the buyers with the sellers for a commission.

The market maker can match buyers and sellers by simply presenting the various options to the buyers and sellers and let them make their decisions individually. The market also supports the role of a broker, who can also take the objectives of one or multiple sellers to optimize their marketing objectives for a commission. For paid listings on search engines, the price for a click from a certain position on the search results page for a certain keyword depends on the price that different "buyers" are willing to bid for that position. This can sometimes create bidding wars between buyers that result in them collectively paying a high price for their clicks. A broker, by pulling together the different competing buyer entities, can collectively optimize the different objectives and requirements thereby providing a lower cost solution to the sellers that meet their objectives.

Exemplary System

Figure 2:
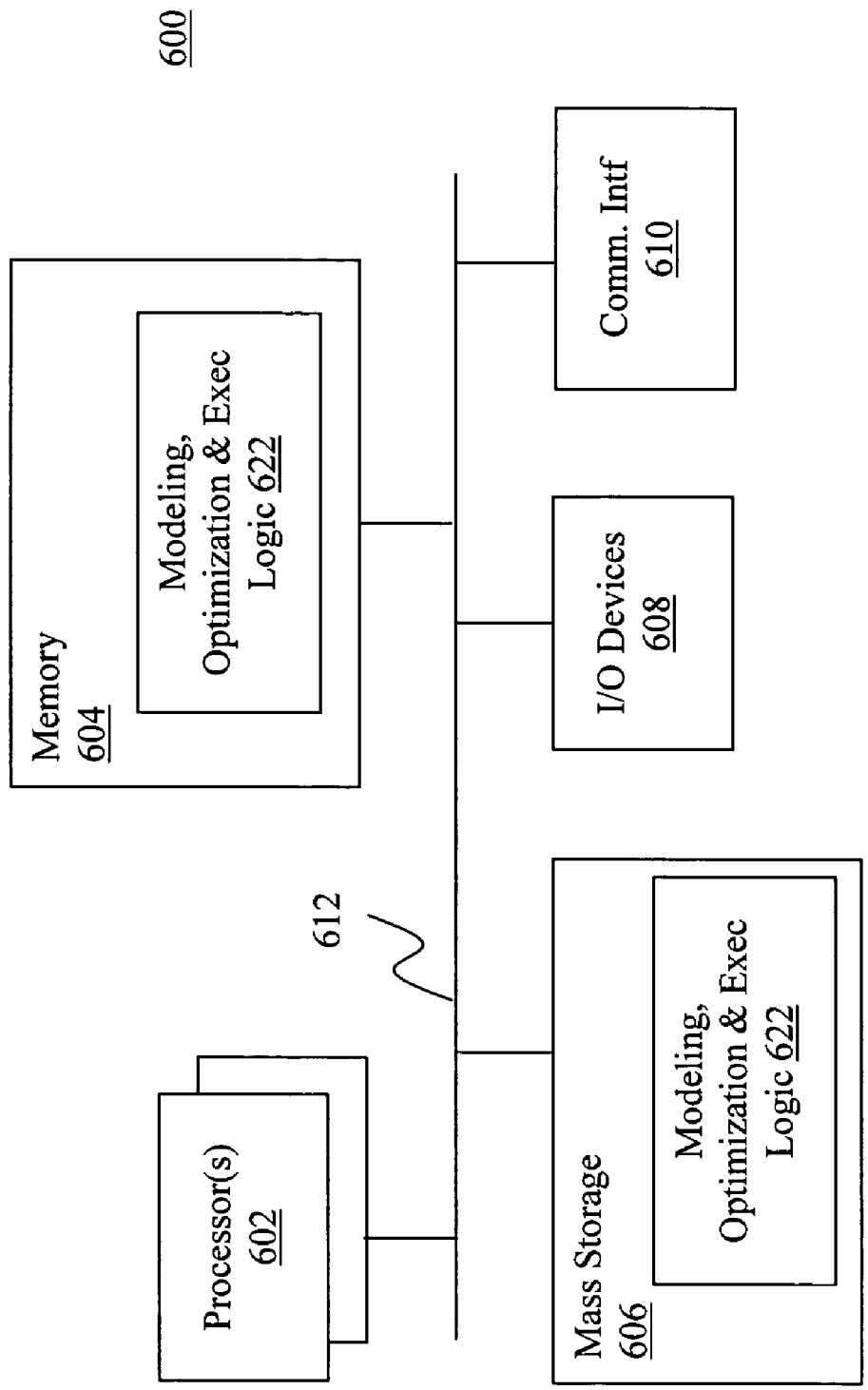
FIG. 2 is a block diagram illustrating a computing device suitable for use to practice the present invention.

FIG. 2 illustrates an example computing system/device suitable for use to practice the present invention, in accordance with one embodiment. As shown, computing system/device 600 includes one or more processors 602, and system memory 604. Additionally, computing system/device 600 includes mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown).

Each of these elements performs its conventional functions known in the art. In particular, system memory 604 and mass storage 606 may be employed to store a working copy and a permanent copy of the programming instructions implementing one or more aspects of the earlier described teachings to practice the present invention, i.e. the modeling, the optimization, the bidding and so forth. The programming instructions may be implemented in assembler instructions supported by processor(s) 602 or high level languages, such as C, that can be compiled into such instructions. The communication to place the bids may be implemented in any one of a number of proprietary or open communication/transaction protocol, including but are not limited to HTTP and TCP/IP.

The permanent copy of the programming instructions may be placed into permanent storage 606 in the factory, or in the field, through e.g. a distribution medium (not shown) or through communication interface 610 (from a distribution server (not shown)).

Except for the modeling, optimization, and bidding logic, the constitution of these elements 602-612 are known, and accordingly will not be further described.

Epilog

Although specific embodiments have been illustrated and described herein for purposes of description of the preferred embodiment, it will be appreciated by those of ordinary skill in the art that a wide variety of alternate and/or equivalent implementations may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A method for determining a bidding strategy for an organization to buy advertising by placing one or more bids amongst a plurality of marketing options at one or more web sites or search engines, the method comprising:

facilitating, by a computing device having a processor and a memory, prior to the organization placing the one or more bids among the marketing options at the one or more web sites or search engines, specification of one or more models that model one or more performance metrics for the plurality of marketing options based at least in part on a plurality of positions occupied by the marketing options in a selected one of on-line query answer sets and contextual advertisements, wherein the plurality of positions occupied by the marketing options are responsive to monetary resources allocated to the one or more bids placed among the marketing options;

determining, by the computing device, prior to the organization placing the one or more bids, a bidding strategy for the organization to direct allocation of monetary resources to place the one or more bids among the plurality of marketing options at the one or more web sites or search engines, wherein determining includes quantitatively finding an optimal solution for an objective function using the specified one or more models, the objective function being one of maximizing clicks to information associated with a product or a service or maximizing revenue of a product or a service, the objective function having variables associated with the allocation of monetary resources for the one or more bids; and after determining the bidding strategy, and prior to the organization placing the one or more bids, the computing device generating a report to report on the determined bidding strategy for the organization to allocate monetary resources to place the one or more bids among the marketing options at the one or more web sites or search engines.

2. The method according to claim 1, wherein the method further comprises facilitating a user, by the computing device, in creating the one or more of models.

3. The method according to claim 1, wherein the one or more models comprise click models for the marketing options that forecast number of clicks for the marketing options for the various positions.

4. The method according to claim 1, wherein the one or more models comprise revenue models for the marketing options that forecast revenues for the marketing options based on click conversions.

5. The method of claim 1, wherein the on-line query answer sets comprises on-line query answer sets of different search engines.

6. The method according to claim 1, wherein the objective function is further one of a group of objective functions, and the group of objective functions includes:

a first objective function to maximize number of clicks for the marketing options, and a second objective function to minimize average cost per click for the marketing options.

7. The method according to claim 6, wherein the group of objective functions further include at least one of:

a third objective function to minimize the average cost per customer for the products or services of the marketing options, a fourth objective function to maximize revenue for the products or services of the marketing options, a fifth objective function to maximize profit for the products or services of the marketing options;

a sixth objective function to minimize marketing expenses for the marketing options; and a seventh objective function to maximize a number of increases in customer sign-ups or registrations for products or services of the marketing options.

8. The method according to claim 1, wherein said finding an optimal solution for the objective function comprises finding an optimal solution for the objective function subject to one or more constraints.

9. The method according to claim 8, wherein the one or more constraints include a constraint requiring a traffic level for a URL for a period of time.

10. The method according to claim 8, wherein the one or more constraints include a constraint requiring a marketing option to be at a selected one of a particular on-line query answer set position, and a particular contextual advertisement position.

11. The method according to claim 8, wherein the one or more constraints include at least one of a constraint requiring a cost limit for average cost per customer, a constraint requiring a cost limit for the marketing options, and a constraint requiring a limit on an amount of revenue generated by products or services of the marketing options.

12. The method according to claim 1, wherein the method further comprises facilitating submission of a bidding for the plurality of marketing options, by the computing device, for the positions for the plurality of marketing options based at least in part on the determined bidding strategy.

13. An article of manufacture comprising:

a non-transitory computer readable storage medium; and a plurality of executable instructions stored therein, and designed to program a computing device to enable the computing device, in response to execution of the instructions, to:

facilitate, prior to an organization placing one or more bids among a plurality of marketing options at one or more web sites or search engines, specification of one or more models that model one or more performance metrics for the plurality of marketing options based at least in part on a plurality of positions occupied by the marketing options in a selected one of on-line query answer sets and contextual advertisements, wherein the plurality of positions occupied by the marketing options are responsive to the monetary resources allocated to the one or more bids placed among the marketing options, determine, prior to the organization placing the one or more bids, a bidding strategy for the organization to direct allocation of monetary resources to place the one or more bids among the plurality of marketing options at the one or more web sites or search engines, wherein determining includes quantitatively finding an optimal solution for an objective function using the specified one or more models, the objective function being one of maximizing clicks to information associated with a product or a service or maximizing revenue of a product or a service, the objective function having variables associated with the allocation of monetary resources for the one or more bids; and after determining the bidding strategy, and prior to the organization placing the one or more bids, generate a report to report on the determined bidding strategy for the organization to allocate monetary resources to place the one or more bids among the marketing options at the one or more web sites or search engines.

14. The article of manufacture according to claim 13, wherein the one or more models comprise click models for the marketing options that forecast number of clicks for the marketing options for the various positions.

15. The article of manufacture according to claim 13, wherein the one or more models comprise revenue models for the marketing options that forecast revenues for the marketing options based on click conversions.

16. The article of manufacture according to claim 13, wherein the on-line query answer sets comprise on-line query answer sets of different search engines.

17. An apparatus, comprising:
a storage medium having stored therein programming instructions designed to enable the apparatus to:
facilitate, prior to an organization placing one or more bids among a plurality of marketing options at one or more web sites or search engines, specification of one or more models that model one or more performance metrics for the plurality of marketing options based at least in part on a plurality of positions occupied by the marketing options in a selected one of on-line query answer sets and contextual advertisements, wherein the plurality of positions occupied by the marketing options are responsive to the monetary resources allocated to the one or more bids placed among the marketing options;
determine, prior to the organization placing the one or more bids, a bidding strategy for the organization to direct allocation of monetary resources to place the one or more bids among the plurality of marketing options at the one or more web sites or search engines, wherein determining includes quantitatively finding an optimal solution for an objective function, using the specified one or more models, the objective function being one of maximizing clicks to information associated with a product or a service or maximizing revenue of a product or a service, the objective function having variables associated with the allocation of monetary resources for the one or more bids; and
after determining the bidding strategy, and prior to the organization placing the one or more bids, generate a report to report on the determined bidding strategy for the organization to allocate monetary resources to place the one or more bids among the marketing options at the one or more web sites or search engines; and at least one processor coupled to the apparatus to execute the instructions.

18. The apparatus according to claim 17, wherein the one or more models comprise click models for the marketing options that forecast number of clicks for the marketing options for the various positions.

19. The apparatus according to claim 17, wherein the one or more models comprise revenue models for the marketing options that forecast revenues for the marketing options based on click conversions.

20. The apparatus according to claim 17, wherein the on-line query answer sets comprise on-line query answer sets of different search engines.

21. The apparatus according to claim 17, wherein the instructions are further designed to enable the apparatus to bid for the positions for the plurality of marketing options based at least in part on the determined bidding strategy.

22. The article according to claim 13, wherein the instructions are further designed to enable the computing device to bid for the positions for the plurality of marketing options based at least in part on the determined bidding strategy.

23. The method according to claim 1, further comprising creating by the computing device, at least one model out of the one or more models by:
receiving by the computing device, empirical data for a plurality of performance metrics for a plurality of purchased marketing option; and
constructing the at least one model, by the computing device, using the empirical data.

24. The method according to claim 13, wherein said finding an optimal solution for the objective function comprises finding an optimal solution for the objective function subject to one or more constraints.

25. The method according to claim 17, wherein said finding an optimal solution for the objective function comprises finding an optimal solution for the objective function subject to one or more constraints.

* * * * *